United States Patent [19]

McNeely et al.

[11] 4,085,178

[45] Apr. 18, 1978

[54] METHOD FOR PRODUCING INJECTION MOLDED AND CENTRALLY APERTURED DISC RECORDS

[75] Inventors: Michael Lee McNeely, Indianapolis, Ind.; Herbert Rees, Willowdale, Canada

[73] Assignee: RCA Corporation, New York, N.Y.

[21] Appl. No.: 694,440

[22] Filed: Jun. 9, 1976

Related U.S. Application Data

[62] Division of Ser. No. 642,162, Dec. 18, 1975, Pat. No. 3,989,436.

[51] Int. Cl.² ............................................. B29D 17/00
[52] U.S. Cl. .................................. 264/106; 264/155; 264/161; 425/810
[58] Field of Search ............... 264/106, 107, 154–156, 264/161; 425/DIG. 810

[56] References Cited

U.S. PATENT DOCUMENTS 2,330,369  9/1943  Marsh ................................. 425/554
2,642,621  6/1953  Amo ..................................... 264/107
3,649,728  3/1972  Honsho ............................. 264/156 X Primary Examiner—Thomas P. Pavelko
Attorney, Agent, or Firm—Eugene M. Whitacre; William H. Meagher; Dilip A. Kulkarni

[57] ABSTRACT

Heated material is injected into an annular cavity, defined by a pair of mold-halves, through a sprue passage, defined by a sprue bushing and an end portion of a punch. The annular cavity and the sprue passage form, respectively, the centrally apertured part and a sprue. After partial cooling of the heated material, the punch is locked in place while the annular cavity is displaced relative to the sprue passage so that the sprue is severed from the part along the peripheral surface of the punch end portion. The mold halves are separated to open the annular cavity while the sprue is resting on the punch end portion, and while the part is held by the punch end peripheral surface. After the mold halves are separated, a sprue ejector member and a part ejector member are actuated to eject, respectively, the sprue and the part from the punch end portion.

2 Claims, 8 Drawing Figures

METHOD FOR PRODUCING INJECTION MOLDED AND CENTRALLY APERTURED DISC RECORDS

This is a division of U.S. Pat. application Ser. No. 642,162, filed Dec. 18, 1975, and now U.S. Pat. No. 3,989,436.

This invention relates generally to method and apparatus for molding a centrally apertured part; and, more particularly, concerns method and apparatus for injection molding a centrally apertured and spirally tracked record, such as a video disc.

While this invention is described herein in the context of an apparatus for injection molding video discs, it has applications in other areas where it is important to have the center hole substantially concentric with the recorded spiral track on the surface of the record: for example, stereo and quadraphonic LP records.

In certain video disc systems, video information is recorded in the form of geometric variations in the bottom of a spiral track on the surface of a centrally apertured record. For playback, the record is mounted on a rotatable turntable having a spindle which engages the record aperture for centering, and, then relative motion is established between the record and a stylus riding in the track. Electrical circuitry serves to translate the variations detected by the track-riding stylus into a signal for effecting a visual display of the recorded video information. A system of the above-mentioned type is described in U.S. Pat. No. 3,842,194 issued to J. K. Clemens.

In such video disc systems, it has been recognized that, not only the average speed of relative motion between the stylus and the record must be maintained at a predetermined speed (e.g., 450 rpm), but the cyclical variations about the average speed must be limited, for proper playback, within specified tolerance limits (e.g. ± 0.01 percent). It is desirable to reduce the cyclical speed variations to assure that the synchronizing pulses in the recovered television signal are fairly stable and within the lockup range of the deflection circuits of a television receiver. The cyclical speed variations are particularly unpleasant where the recorded information is a color television signal.

One of the sources of cyclical speed variations is the record eccentricity. For proper playback of the video disc, it is important that the replicated record's center hole is concentric with the spiral groove center to a high degree of accuracy.

The concentricity between the record center hole and the record spiral track is particularly important (1) where the record playback speed is relatively high (e.g., 450 rpm), (2) where the record groove density is relatively high (e.g., 5,555 gpi), and (3) where the bandwidth of the recorded signal is relatively high (e.g., 4.3 to 6.3 MHz).

Pursuant to the principles of the present invention, an injection molding technique with an in-mold punching feature is disclosed for replicating centrally apertured and spirally tracked records to assure concentricity to a high degree. An excellent concentricity is obtained because both operations, the molding of the part and the punching of the sprue to form the center hole therein, are performed in a single set-up.

For production of a record without any flow lines and other surface defects in the recorded region, it is important to inject the plastic material into the mold cavity at the center. Therefore, the use of a core/plug arrangement to form a center-hole in the record is not practical. Pursuant to the principles of the present invention, a novel arrangement for forming the center hole in the record is disclosed.

Additionally, for production of a record without any flow lines and other surface defects in the recorded region, solidified particles from previously injected shots cannot be tolerated in subsequent shots. Pursuant to the principles of the present invention, a novel arrangement for sprue removal, which prevents appearance of solidified particles in the injected shots, is disclosed. Further, it is desirable that the sprue removal arrangement must be suitable for producing a record having a relatively large center hole (e.g., 1½ and one-half inch).

A first mold-half and a second mold-half are reciprocably mounted to a platen. A sprue bushing having an opening in communication with an injection nozzle is secured to the platen. A punch, having an end portion in registry with the sprue bushing, is reciprocably mounted relative to the second mold-half. When the second mold-half is in a closed location, (1) the punch end portion and the opening in the sprue bushing define a sprue passage, and (2) the first and the second mold halves define an annular cavity surrounding the sprue passage. The annular cavity and the sprue passage form, respectively, the centrally apertured part and the sprue when heated material is injected therein. After partial cooling of the heated injected material, the first and the second mold halves move from the closed location to a location intermediate of the closed location and an open location while the punch is locked in place to sever the sprue from the part along the peripheral surface of the punch end portion. A portion of the first mold-half, where the punch end portion enters, serves as a die. The mold halves are thereafter separated to open the annular cavity while the sprue is resting on the punch end portion, and while the part is held by the punch end peripheral surface. After the mold halves are separated, a sprue ejector member and a part ejector member are actuated to eject, respectively, the sprue and the part from the punch end portion.

In the accompanying drawings in which like reference characters refer to similar parts:

Figure 1:
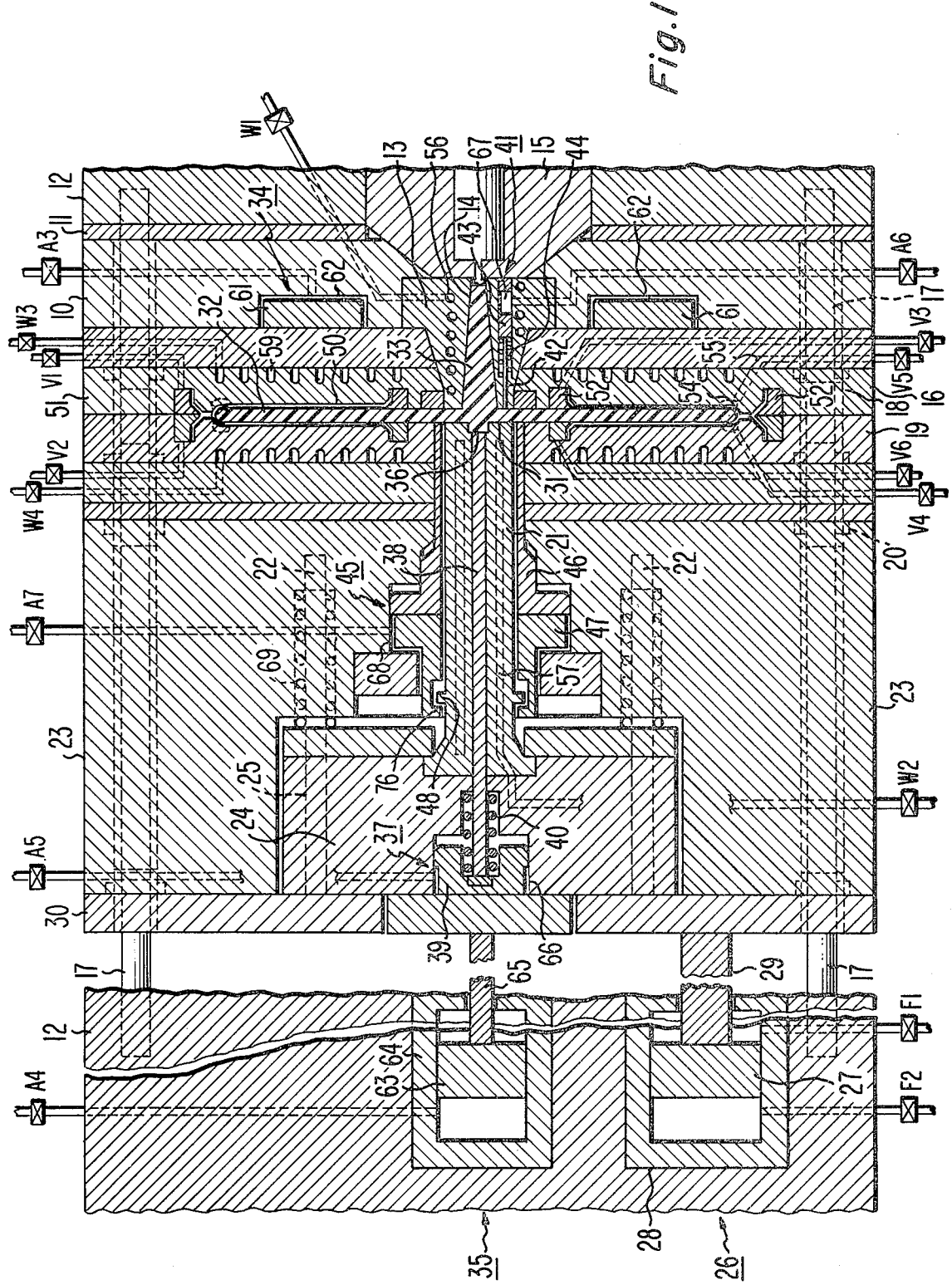
FIG. 1 is a partly schematic, sectioned elevation view of an injection molding apparatus for replicating centrally apertured and spirally tracked records pursuant to the principles of the present invention.

Referring to the drawings, a platen 10 and a spacer plate 11 are secured to a frame 12 of an Injection molding machine. A sprue bushing 13 having an opening 14 which communicates with an injection nozzle 15 is secured to the platen 10. First bearing means support a reciprocal motion of a first mold half 16 relative to the platen 10 between a closed location (FIG. 1) and an intermediate location (FIGS. 2–7). The first bearing means includes a set of guide pins 17 (e.g., 4) spacedly secured to the machine frame 12. The first mold-half 16 has a set of openings 18 through which the guide pins 17 are inserted.

Figure 6:
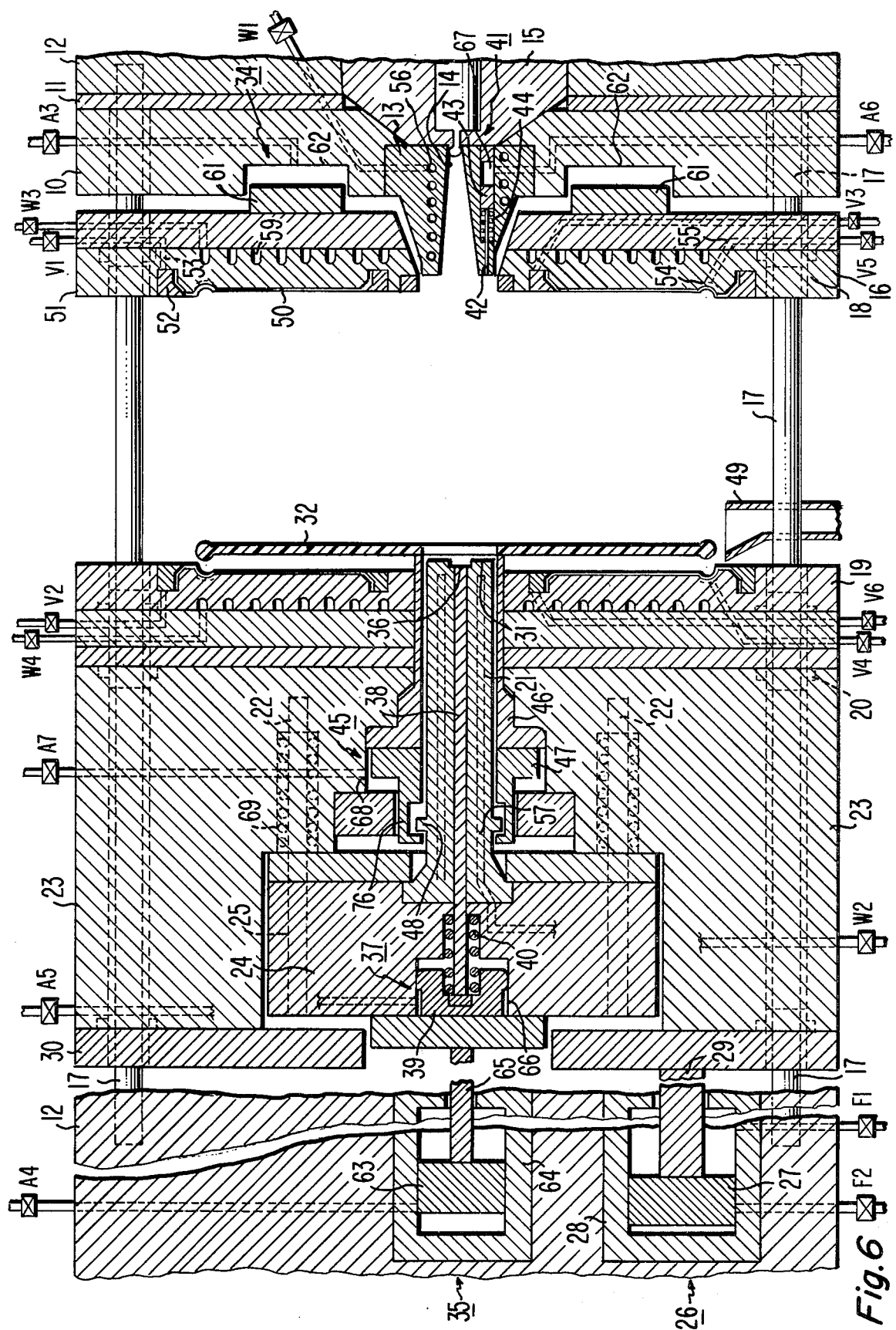
Figure 7:
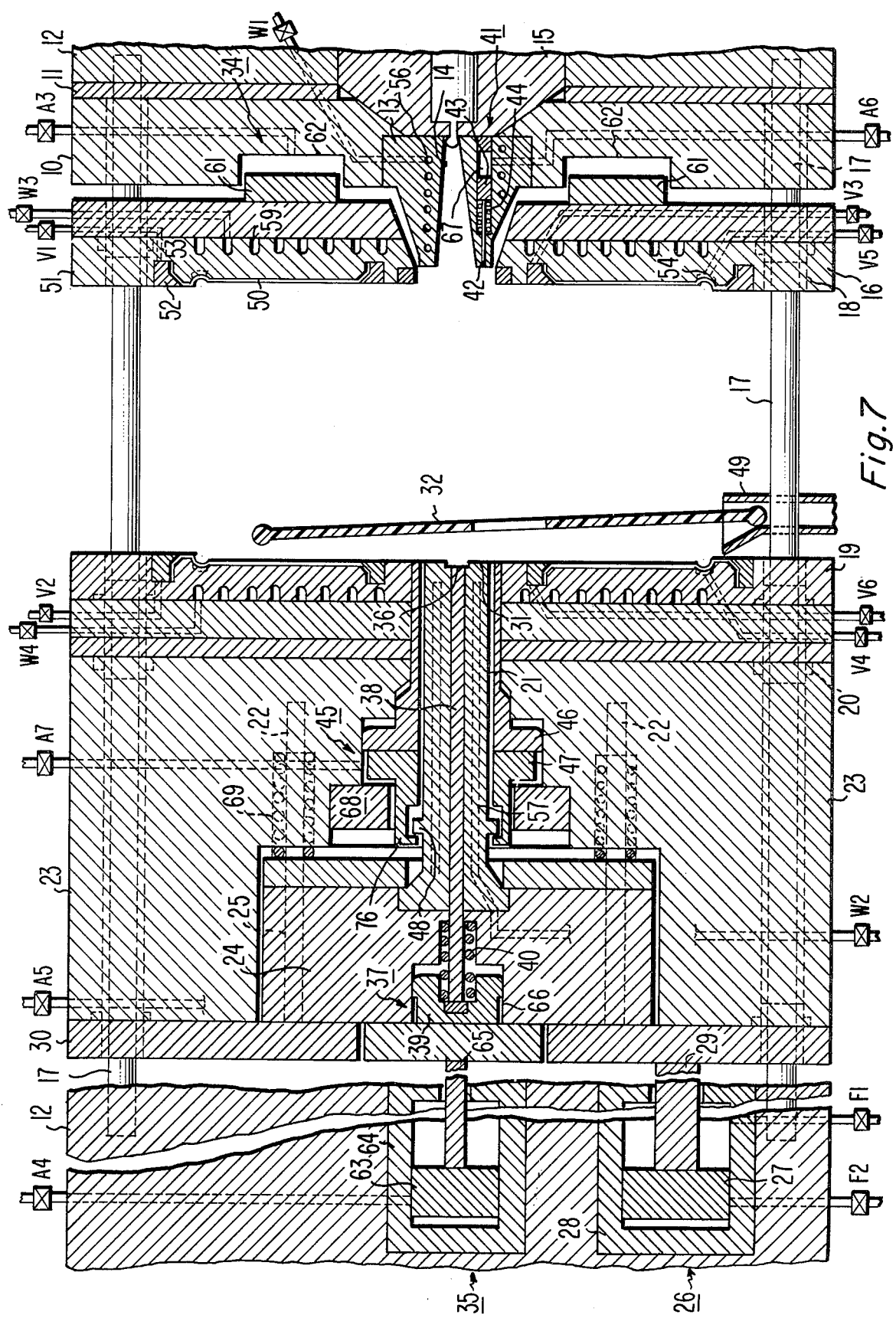

Second bearing means support a reciprocal motion of a second mold-half 19 relative to the platen 10 between a closed location (FIG. 1), and an open location (FIGS. 6 and 7). In this embodiment, the guide pins 17 also serve as the second bearing means. The second mold-half 19 also has a set of openings 20 through which the guide pins 17 are inserted.

Third bearing means support reciprocal motion of a punch 21 relative to the second mold-half 19 between a first position (FIGS. 1 and 7) and a second position (FIGS. 2-6). The third bearing means includes a second set of guide pins 22 secured to a second mold-half carrier 23. A punch carrier 24, which carries the punch 21, has a set of openings 25, through which the guide pins 22 are inserted.

First selectively actuated means 26 cause motion of the second mold-half between the closed location (FIG. 1) and the open location (FIGS. 6 and 7). The first selectively actuated means 26 comprises a piston 27 riding in a cylinder 28. A connecting rod 29 connects the piston 27 to an isolation plate 30 which is secured to the second mold-half carrier 23. Pressurized fluid is admitted into the cylinder 28 through a fluid valve F1 to move the second mold-half 19 from the closed loaction (FIG. 1) to the open location (FIGS. 6 and 7). Pressurized fluid is admitted into the cylinder 28 through a fluid valve F2 to move the second mold-half 19 from the open location (FIGS. 6 and 7) to the closed location (FIG. 1).

When the first and the second mold halves (16 and 19) are in the closed location (FIG. 1), (1) an end portion 31 of the punch 21 and the sprue bushing opening 14 define a sprue passage, and (2) the first and second mold halves define an annular cavity surrounding the sprue passage. The annular cavity and the sprue passage form, respectively, a centrally apertured part 32 and a sprue 33 when heated material (e.g., rigid PVC blend) is injected therein.

Second selectively actuated means 34 cause motion of the first mold-half 16 with the second mold-half 19 in response to motion of the second mold-half from the closed location (FIG. 1) to a location which is intermediate (FIG. 2) of the closed location and an open location (FIGS. 6 and 7) whereby the annular cavity remains closed while the first and the second mold halves move from the closed location to the intermediate location. The second selectively actuated means 34 comprises a piston 61, in the form of an annular ring, riding in a cylinder 62, in the form of an annular recess in the platen 10. Pressurized air is admitted in the cylinder 62 through an air valve A3 to move the first mold-half 16 from the closed location (FIG. 1) to the intermediate location (FIGS. 2-7).

Figure 8:
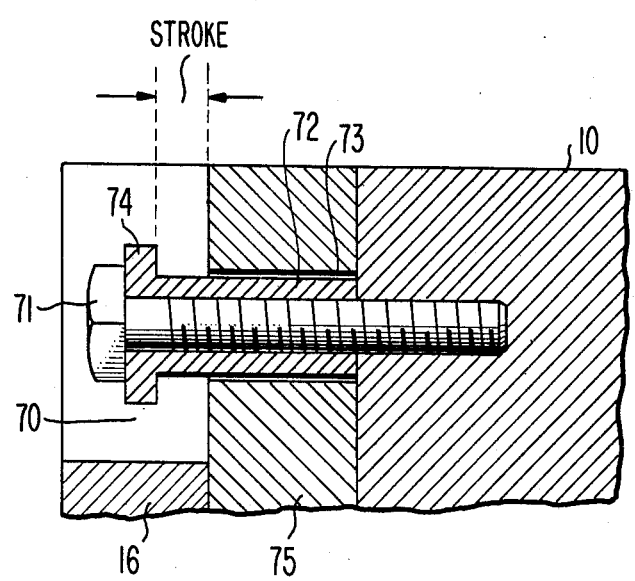
FIG. 8 illustrates an arrangement for limiting the stroke of a first mold-half between a closed location and an intermediate location.

FIG. 8 illustrates an arrangement for limiting the stroke of the first mold-half 16 between the closed location (FIG. 1) and the intermediate location (FIGS. 2-7). A sleeve 70 is secured to the platen 10 by a bolt 71. The sleeve 70 has a shank portion 72 which passes freely in an opening 73 in the first mold-half 16. The distance between a head portion 74 of the sleeve 70 and a baseplate 75 of the first mold-half 16 limits the stroke of the first mold-half between the closed location (FIG. 1) and the intermediate location (FIGS. 2-7).

Figure 2:
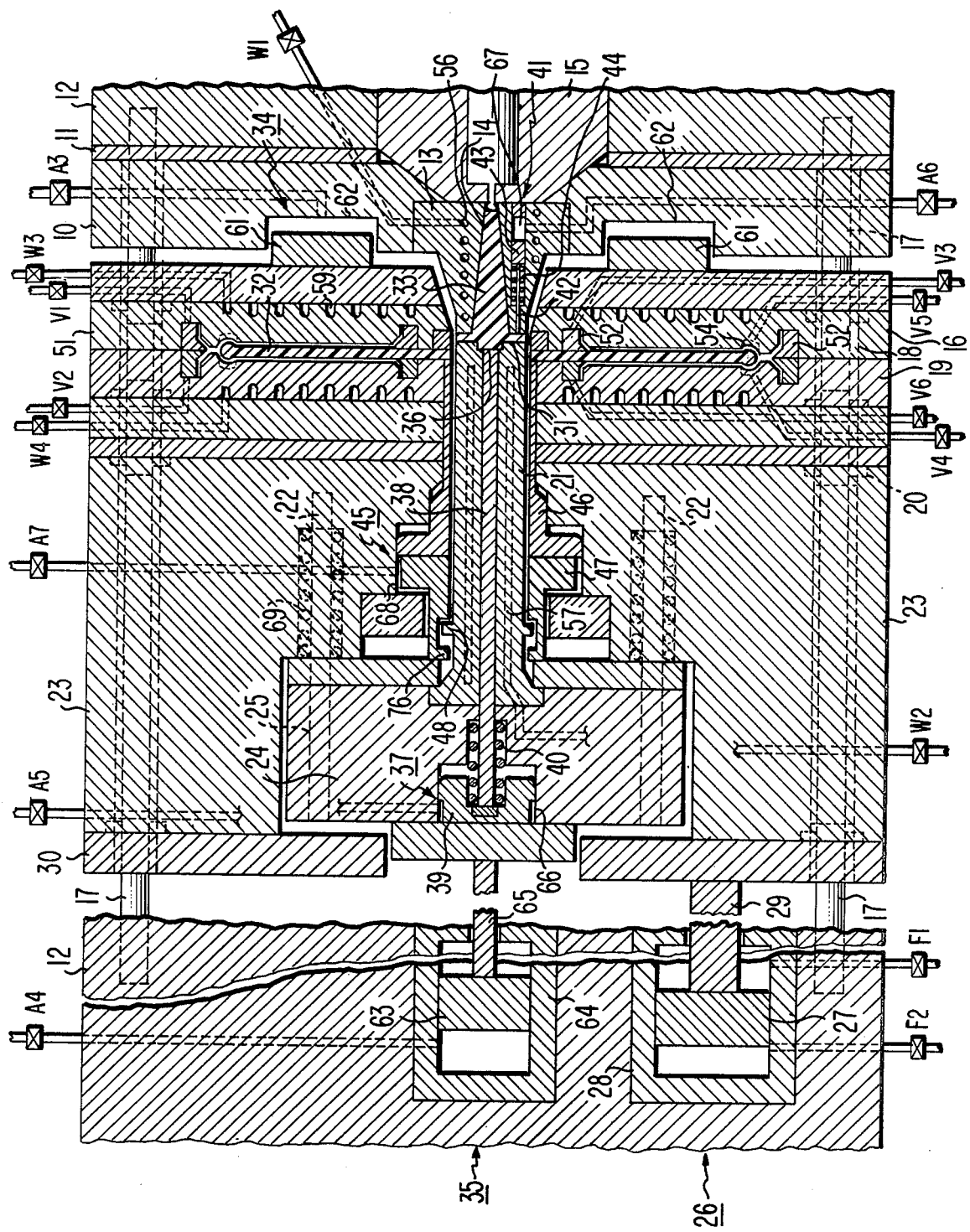
FIGS. 2–7 illustrate a sequence of operations executed by the injection molding apparatus of FIG. 1 for replication of records.

Third selectively actuated means 35 lock the punch in place while the first and second mold halves (16 and 19) move from the closed location (FIG. 1) to the intermediate location (FIG. 2) whereby the sprue 33 is severed from the part 32 along the peripheral surface of the punch end portion 31. A portion of the first mold-half 16 where the punch end portion 31 enters serves as a die. Third selectively actuated drive means 35 comprises a piston 63 riding in a cylinder 64. A connecting rod 65 connects the piston 63 to the punch carrier 24. Pressurized air is admitted in the cylinder 64 through an air valve A4 to lock the punch 21 in place while the first and second mold halves (16 and 19) move from the closed location (FIG. 1) to the intermediate location (FIG. 2). After the second mold-half 19 reaches the intermediate location (FIG. 2), the punch carrier 24 moves with the second mold-valve from the intermediate location (FIG. 2) to the open location (FIG. 6). A spring 69 is provided for returning the punch carrier 24 to the first position (FIGS. 1 and 7) after the part 32 is ejected (FIG. 6).

Figure 3:
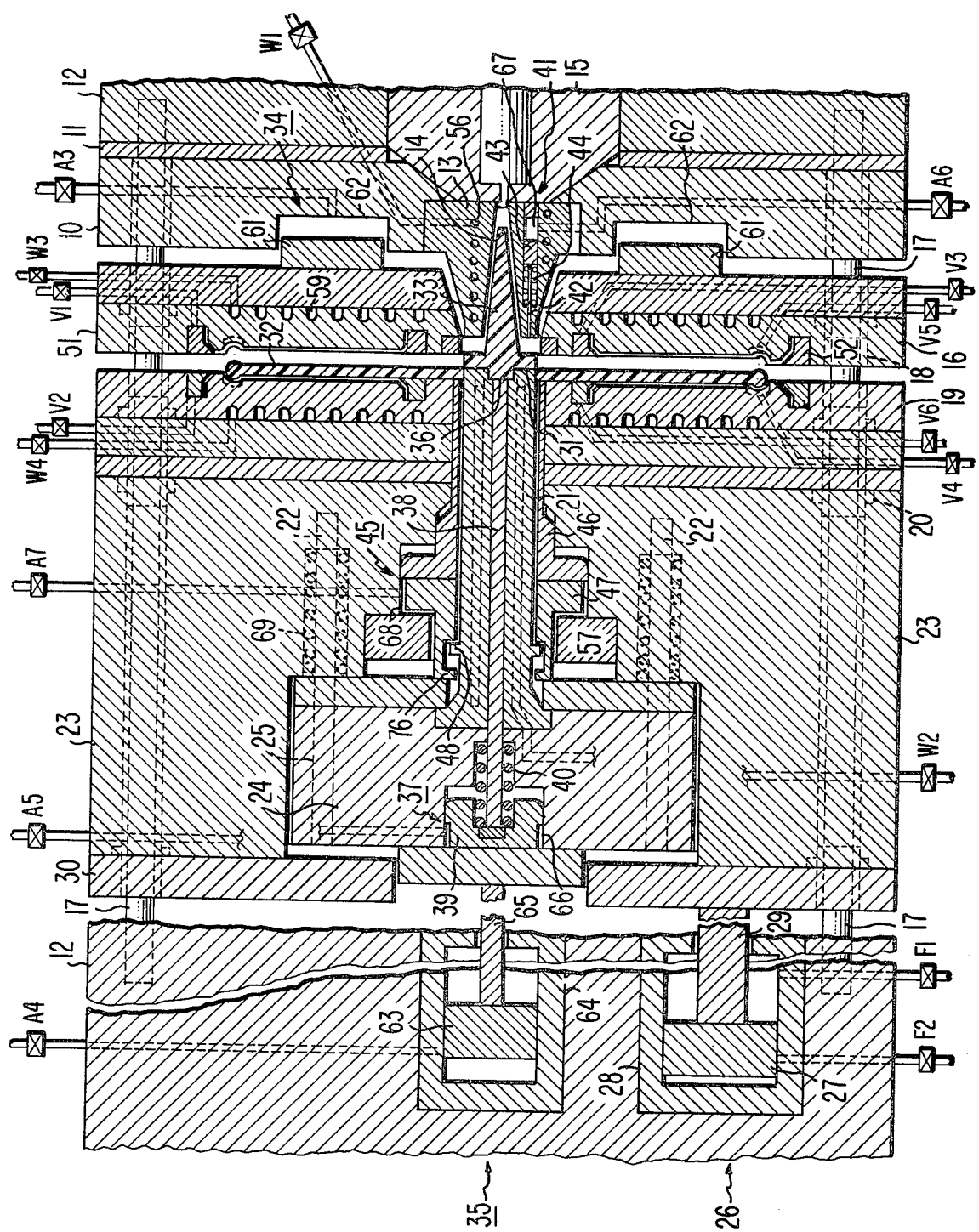

As illustrated in FIG. 3, the first and the second mold-halves are separated to open the annular cavity while the sprue 33 is held in an undercut 36 in the punch end portion 31, and while the part 32 is resting on the punch end peripheral surface.

Figure 4:
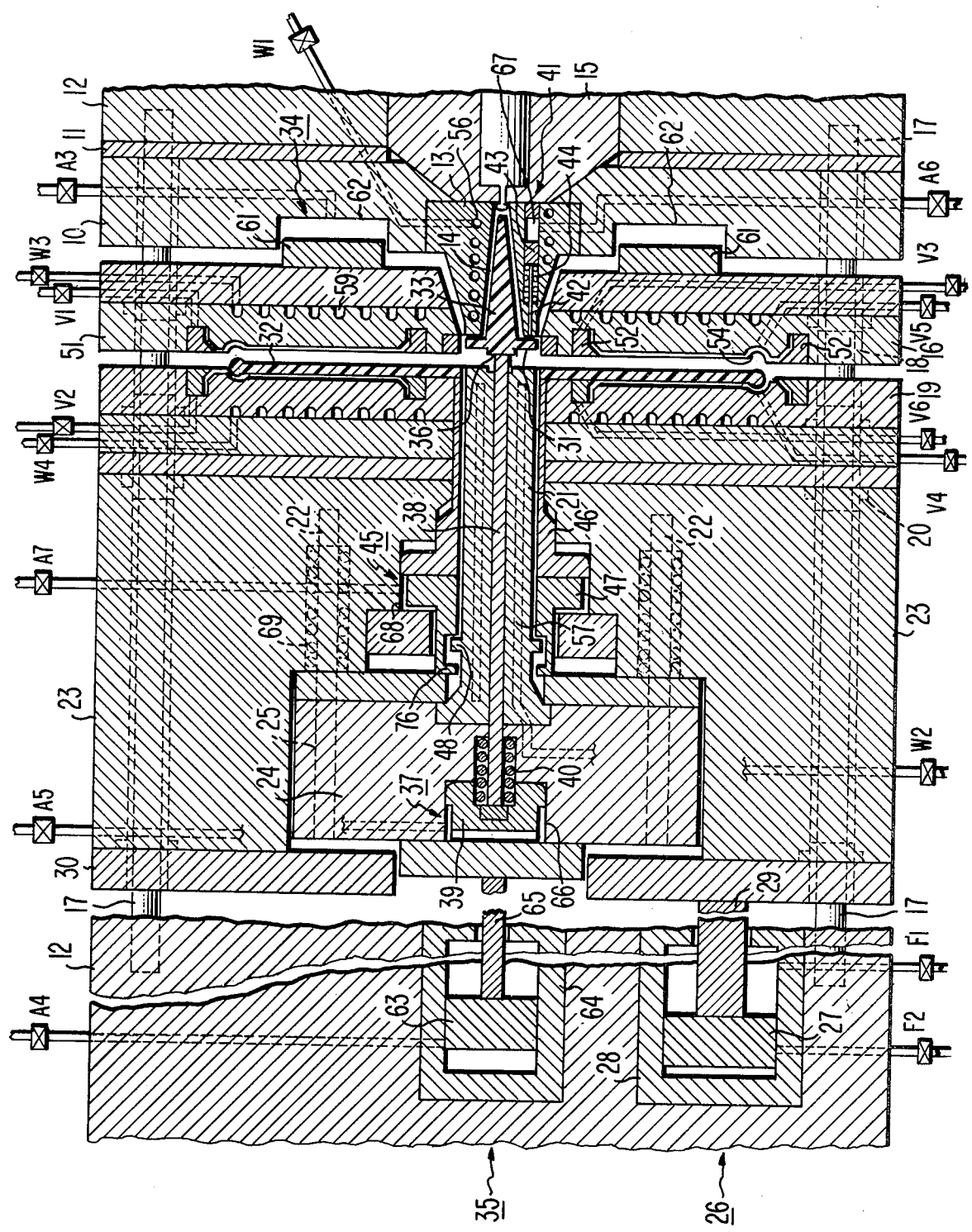
Figure 5:
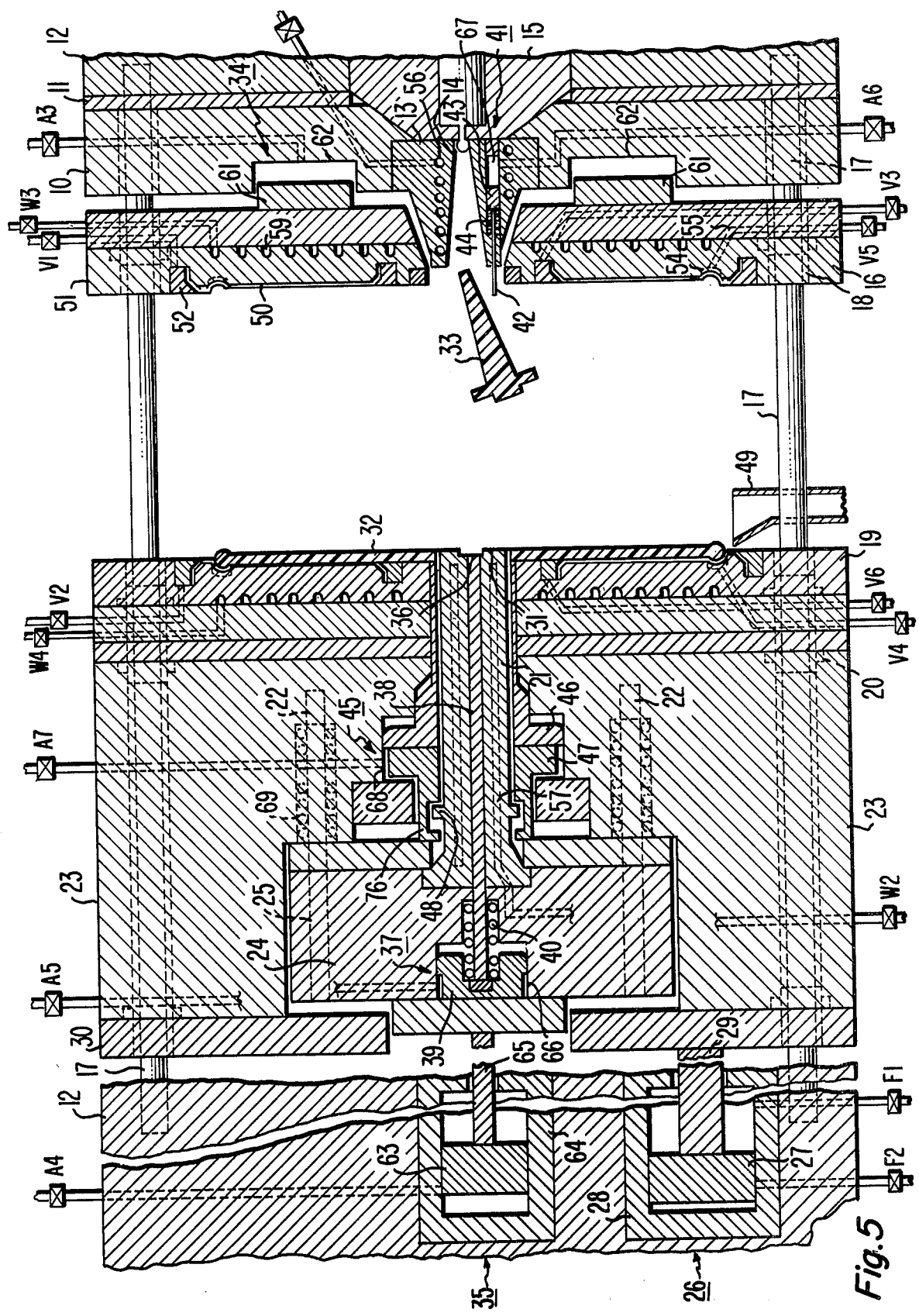

As illustrated in FIGS. 3, 4 and 5, first means 37 are provided for ejecting the sprue 33 from the punch end portion 31 after the sprue is severed. The first sprue ejecting means 37 includes a first sprue ejector member 38 mounted in an opening in the punch end portion 31 for movement toward and away from a retracted position (FIGS. 3 and 5). Fourth selectively actuated means 39 advances the first sprue ejector member 38 away from the retracted position (FIG. 3) to an advanced position (FIG. 4) so as to eject the sprue 33 from the punch end portion 31. Pressurized air is admitted in a cylinder 66 through an air valve A5 to advance the sprue ejector member 38 away from the retracted position (FIG. 3). A spring 40 is provided for returning the first sprue ejector member 38 to the retracted position (FIG. 5) after sprue ejection (FIG. 4).

In one embodiment of the present invention, ejection of the sprue 33 from the punch end portion 31 by the first sprue ejecting means 37, after the sprue is severed, leaves the sprue in the sprue bushing 13 as shown in FIG. 4. As illustrated in FIGS. 4, 5 and 6, second means 41 are provided for ejecting the sprue 33 from the sprue bushing 13 after the ejection of the sprue from the punch end portion 31. The second sprue ejecting means 41 includes a second sprue ejector member 42 mounted in an opening in the sprue bushing 13 for movement toward and away from a withdrawn position (FIGS. 4 and 6). Fifth selectively actuated means 43 advances the second sprue ejector member 42 away from the withdrawn position (FIG. 4) to an advanced position (FIG. 5) so as to launch the sprue 33 from the sprue bushing 13. Pressurized air is admitted in a cylinder 67 through an air valve A6 to advance the sprue ejector member 44 away from the withdrawn position (FIG. 4). A spring 44 is provided for returning the second sprue ejector member 42 to the retracted position (FIG. 6) after sprue launching (FIG. 5).

As illustrated in FIGS. 5, 6 and 7, the apparatus further includes means 45 for ejecting the part 32 from the punch end peripheral surface after sprue ejection. The part ejecting means 45 comprises a part ejector sleeve 46 which is mounted in an opening in the second mold-halve 19 for movement toward and away from a retarded position (FIGS. 5 and 7). Sixth selectively actuated means 47 advances the part ejector sleeve 46 away from the retarded position (FIG. 5) to an advanced position (FIG. 6) so as to eject the part 32 from the punch end peripheral surface. Pressurized air is admitted in a cylinder 68 through an air valve A7 to advance the part ejector sleeve 46 away from the retarded position (FIG. 5). Bayonet hooks 48 are provided for returning the part ejector sleeve 46 to the retarded position (FIG. 7) after part ejection (FIG. 6). After the molded part 32 is ejected, as shown in FIG. 7, the part drops in a chute 49 which is inserted between the first and second mold halves (16 and 19) when the mold halves are fully open (FIGS. 6–7). While the chute 49 is provided for collecting the molded part 32 in this particular embodiment, other transfer means, such as a pickup arm, may be used to collect the molded parts.

As illustrated in FIGS. 6 and 7, the spring 69 returns the punch carrier 24 to the first position (FIG. 7) after the part 32 is ejected. The bayonet hooks 48 provided on the punch 21, which is secured to the punch carrier 24, engage the projections 76 on the selectively actuated means 47 to return the selectively actuated means 47 and the sleeve 46 to the retarded position (FIG. 7).

Where the centrally apertured part is a disc record, each of the first and second mold halves (16 and 19) includes an annular stamper 50 which is secured to a plate 51 by a set of hold down rings 52. Each of the annular stampers 50 is coined at the inner and outer peripheral surfaces. The hold down rings 52 secure the coined peripheral surfaces of a respective one of the annular stampers 50 to a respective one of the plates 51. A respective one of the hold down rings 52 is bolted to a respective one of the plates 51.

A channel 54 is provided on the surface of each of the plates 51 underneath a respective one of the stampers 50. Air is evacuated from the surface channels 54 through vacuum valves V5 and V6 to assure that the stampers 50 are flatly and securely held by the respective plates 51.

The sprue bushing 13 further includes a subsurface channel 56 for circulating water therethrough (at 70° F) to maitain the sprue bushing at a temperature which facilitates the severance of the sprue 33 from the part 32. Water is admitted in the subsurface channel 56 through a water valve W1.

The punch 21 further includes a subsurface channel 57 for circulating water therethrough to maintain the punch end portion 31 at the temperature which facilitates the severance of the sprue 33 from the part 32. Water is admitted in the subsurface channel 57 through a water valve W2.

Air is evacuated from the annular cavity and the sprue passage through vacuum valves V1, V2, V3, and V4 to facilitate injection of plastic material into the annular cavity.

Each of the plates 50 further includes a subsurface channel 59 for circulating water therethrough so as to maintain a respective one of the mold halves (16 and 19) at a certain desirable temperature for injection molding of the parts. Water is admitted in the subsurface channels 59 through water valves W3 and W4.

It is important to note that a high degree of concentricity between the record spiral track and the record center hole is obtained because both operations, the formation of the spirally tracked record and punching of the sprue to define the record center hole, are performed in a single set-up. A master, from which the stamper is generated, has a circular track near the outer periphery which is very accurately positioned relative to the recorded spiral track. When the stamper is replicated from the master, both the circular track and the recorded spiral track are transferred to the stamper. In the blanking and coining operation, the circular track on the stamper is used to precisely center the inner and the outer coined surfaces on the stamper with respect to the recorded spiral track. In the set-up, the inner and the outer coined surfaces on the stamper cooperate with the corresponding mating surfaces on the mold to obtain highly accurate positioning of the stamper on the mold. Similarly, the punch peripheral surface which defines the record center hole is very precisely located relative to the mating surfaces on the mold. Since both the stamper, which forms the record spiral track, and the punch peripheral surface, which defines the record center hole, are very carefully aligned with respect to the mold, a high degree of concentricity between the record spiral track and the record center hole is obtained.

What is claimed is:

1. A method for forming a disc record having an annular recorded region surrounding a centering aperture therein; said method comprising the steps of:
   (A) injecting heated material into an annular cavity defined by a pair of mold halves through a sprue passage located at the center of said annular cavity and defined by a sprue bushing and an end portion of a punch; and said annular cavity and said sprue passage forming, respectively, said centrally apertured record and a sprue;
   (B) locking said punch in place while said annular cavity is displaced relative to said sprue passage so that said sprue is severed from said record along the peripheral surface of said punch end portion;
   (C) separating said mold halves to open said annular cavity while said sprue is resting on said punch end portion and while said record is held by said punch end peripheral surface;
   (D) actuating a sprue ejector member to eject said sprue from said punch end portion; and
   (E) actuating a record ejector member to eject said record from said punch peripheral surface.

2. A method for forming a disc record having an annular recorded region surrounding a centering aperture therein; said method comprising the steps of:
   (A) injecting heated material into an annular cavity defined by a pair of mold halves through a sprue passage located at the center of said annular cavity and defined by a sprue bushing and an end portion of a punch; and said annular cavity and said sprue passage forming, respectively, said centrally apertured record and a sprue;
   (B) locking said punch in place while said annular cavity is displaced relative to said sprue passage so that said sprue is severed from said record along the peripheral surface of said punch end portion;
   (C) separating said mold halves to open said annular cavity while said sprue is resting in said sprue bushing and while said record is held by said punch end peripheral surface;
   (D) actuating a sprue ejector member to eject said sprue from said sprue bushing; and
   (E) actuating a record ejector member to eject said record from said punch peripheral surface.

* * * * *

UNITED STATES PATENT OFFICE
CERTIFICATE OF CORRECTION

PATENT NO. : 4,085,178
DATED : APRIL 18, 1978
INVENTOR(S) : MICHAEL LEE McNEELY, ET AL.

It is certified that error appears in the above-identified patent and that said Letters Patent are hereby corrected as shown below:

Column 2, lines 15-16

Change "(e.g., 1-1/2 and one-half inch)." to --(e.g., one and one-half inch).--

Column 3, lines 24-25

Change "loaction" to --location--

*Signed and Sealed this*

*Nineteenth* Day of *September 1978*

[SEAL]

*Attest:*

RUTH C. MASON
*Attesting Officer*

DONALD W. BANNER
*Commissioner of Patents and Trademarks*